(12) United States Patent
Andrews et al.

(10) Patent No.: US 10,455,654 B1
(45) Date of Patent: *Oct. 22, 2019

(54) DISTRIBUTED LOW VOLTAGE POWER SYSTEMS

(71) Applicant: Cooper Technologies Company, Houston, TN (US)

(72) Inventors: James Christopher Andrews, Mableton, GA (US); James Moan, Fayetteville, GA (US); Liang Fang, Peachtree City, GA (US); William Lee Shiley, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 482 days.

This patent is subject to a terminal disclaimer.

(21) Appl. No.: 15/179,525

(22) Filed: Jun. 10, 2016

Related U.S. Application Data

(63) Continuation-in-part of application No. 14/695,535, filed on Apr. 24, 2015, now Pat. No. 9,647,459.
(Continued)

(51) Int. Cl.
*H05B 33/08* (2006.01)
*H02J 13/00* (2006.01)

(52) U.S. Cl.
CPC ...... *H05B 33/0842* (2013.01); *H02J 13/0062* (2013.01)

(58) Field of Classification Search
CPC .................................. H02J 13/0062; H02J 4/00
See application file for complete search history.

(56) References Cited

U.S. PATENT DOCUMENTS

| | | | | |
|---|---|---|---|---|
| 6,114,632 A | * | 9/2000 | Planas, Sr. | H01B 9/003 174/117 R |
| 6,989,735 B2 | * | 1/2006 | Fisher | H04B 3/542 340/12.39 |

(Continued)

FOREIGN PATENT DOCUMENTS

| | | |
|---|---|---|
| CN | 102696162 | 9/2012 |
| WO | WO 03/039022 | 5/2003 |

(Continued)

OTHER PUBLICATIONS

International Search Report for PCT/US2015/032263, dated Jul. 17, 2015.

*Primary Examiner* — Pinping Sun
(74) *Attorney, Agent, or Firm* — King & Spalding LLP

(57) ABSTRACT

A distributed low voltage power system is disclosed herein. The system can include a power source generating line voltage power, and a line voltage cable having a first end and a second end, where the line voltage end is coupled to the power source. The system can also include a power distribution module (PDM) having a power transfer device and an output channel. The system can further include a communication link coupled to the output channel of the PDM. The system can also include a point-of-load (POL) control device coupled to the output channel of the PDM using the communication link, where the POL control device generates a distributed LV signal using a LV signal received from the PDM. The system can further include at least one LV device coupled to the point-of-load control device, where the distributed LV signal provides power regulation to the at least one LV device.

20 Claims, 6 Drawing Sheets

Related U.S. Application Data

(60) Provisional application No. 62/003,607, filed on May 28, 2014.

(56) References Cited

U.S. PATENT DOCUMENTS

| | | | | |
|---|---|---|---|---|
| 7,459,892 | B2 * | 12/2008 | Chapuis | H02J 13/0003 323/282 |
| 7,573,372 | B2 * | 8/2009 | Mogilner | H05B 37/0263 315/318 |
| 7,737,961 | B2 * | 6/2010 | Chapuis | G06F 1/189 345/204 |
| 7,863,779 | B1 * | 1/2011 | Pineda | G06F 1/28 307/140 |
| 7,908,402 | B2 * | 3/2011 | Fernald | H02M 3/1584 323/222 |
| 8,405,323 | B2 * | 3/2013 | Finney | H05B 37/0245 315/130 |
| 8,502,470 | B2 | 8/2013 | Barnett | |
| 8,543,246 | B2 * | 9/2013 | Yuen | H02J 3/06 323/299 |
| 9,647,459 | B2 * | 5/2017 | Andrews | H02J 4/00 |
| 9,812,874 | B2 * | 11/2017 | Andrews | H02J 4/00 |
| 2005/0053087 | A1 * | 3/2005 | Pulyk | H01R 31/065 370/463 |
| 2007/0145826 | A1 | 6/2007 | Clark | |
| 2007/0222399 | A1 * | 9/2007 | Bondy | F21S 2/00 315/291 |
| 2007/0273307 | A1 | 11/2007 | Westrick | |
| 2009/0015396 | A1 * | 1/2009 | Yeh | G08B 25/06 340/538.17 |
| 2010/0052536 | A1 | 3/2010 | Zielinski | |
| 2010/0066484 | A1 * | 3/2010 | Hanwright | G06F 3/147 340/3.44 |
| 2010/0244695 | A1 * | 9/2010 | Van Herpen | B32B 17/10036 315/51 |
| 2011/0062888 | A1 * | 3/2011 | Bondy | H05B 33/0815 315/294 |
| 2012/0068618 | A1 | 3/2012 | Koski | |
| 2012/0133298 | A1 * | 5/2012 | Campbell | H05B 37/0263 315/250 |
| 2012/0181865 | A1 | 7/2012 | Muthu | |
| 2012/0267953 | A1 | 10/2012 | Doyle | |
| 2012/0283891 | A1 * | 11/2012 | Merkel | H02J 1/06 700/295 |
| 2013/0079902 | A1 * | 3/2013 | Kamenetz | G05B 19/0421 700/82 |
| 2013/0147367 | A1 | 6/2013 | Cowburn | |
| 2013/0207593 | A1 * | 8/2013 | Kong | H04L 12/413 320/107 |
| 2013/0211608 | A1 * | 8/2013 | Farrell | G06F 1/26 700/286 |
| 2014/0139140 | A1 | 5/2014 | Yeh | |
| 2014/0355297 | A1 | 12/2014 | Castillo et al. | |
| 2015/0094827 | A1 | 4/2015 | Harish et al. | |
| 2015/0130369 | A1 | 5/2015 | Lavato | |
| 2015/0349535 | A1 | 12/2015 | Andrews | |
| 2018/0123351 | A1 * | 5/2018 | Andrews | H02J 4/00 307/25 |

FOREIGN PATENT DOCUMENTS

| | | |
|---|---|---|
| WO | WO 2011/039601 | 4/2011 |
| WO | WO 2011/079912 | 7/2011 |

* cited by examiner

DISTRIBUTED LOW VOLTAGE POWER SYSTEMS

CROSS-REFERENCE TO RELATED APPLICATIONS

This application is a continuation-in-part application of and claims priority to U.S. patent application Ser. No. 14/695,535, titled "Distributed Low Voltage Power Systems", filed on Apr. 24, 2015, which claims priority under 35 U.S.C. § 119 to U.S. Provisional Patent Application Ser. No. 62/003,607, titled "Distributed Low Voltage Power Systems" and filed on May 28, 2014. The entire contents of the above-mentioned applications are hereby incorporated herein by reference.

TECHNICAL FIELD

Embodiments described herein relate generally to power distribution systems, and more particularly to systems, methods, and devices for low voltage power distribution systems.

BACKGROUND

Certain devices within distributed power systems can operate on different types (e.g., direct current (DC), alternating current (AC)) and/or amounts (e.g., 24V, 2A, 120V, 50 mA) of power relative to the type and amount of power that feeds the distributed power system. Further, the devices receiving power from the device distributing the power within the distributed power system can be located relatively close.

SUMMARY

In general, in one aspect, the disclosure relates to a distributed low voltage power system. The distributed low voltage power system can include a power source generating line voltage power. The distributed low voltage power system can also include a first line voltage cable having a first line voltage end and a second line voltage end, where the first line voltage end is coupled to the power source. The distributed low voltage power system can further include a first power distribution module (PDM) having a first power transfer device, where the second line voltage end of the first line voltage cable is coupled to the first PDM, where the first PDM receives the input power from the power source through the first line voltage cable, where the first power transfer device generates a first low-voltage (LV) signal from the input power, and where the first PDM comprises a first output channel. The distributed low voltage power system can also include a first communication link coupled to the first output channel of the PDM. The distributed low voltage power system can further include a first point-of-load (POL) control device coupled to the first output channel of the first PDM using the first communication link, where the first POL control device generates at least one first distributed LV signal based on the first LV signal received from the first PDM. The distributed low voltage power system can also include at least one first LV device coupled to the first POL control device, where the first POL control device sends the at least one first distributed LV signal to the at least one first LV device, where the at least one first distributed LV signal provides power regulation to the at least one first LV device.

In another aspect, the disclosure can generally relate to a power distribution module. The power distribution module can include an input portion configured to receive line voltage power from a power source. The power distribution module can also include a power transfer device electrically coupled to the input portion, where the power transfer device is configured to generate at least one low-voltage (LV) signal using the line voltage power. The power distribution module can further include an output section electrically coupled to the power transfer device and having a number of channels, where each channel of the output section is configured to deliver the at least one LV signal to a point-of-load (POL) control device using at least one communication link, where the POL control device generates at least one distributed LV signal based on the at least one LV signal received from the output section, where the at least one distributed LV signal provides power regulation to at least one LV device.

In yet another aspect, the disclosure can generally relate to a point-of-load (POL) control module. The POL control module can include an input portion configured to receive a first communication link that carries at least one low-voltage (LV) signal. The POL control module can also include a controller device electrically coupled to the input portion, where the controller device generates at least one distributed LV signal based on the at least one LV signal. The POL control module can further include an output section electrically coupled to the controller device and having a number of channels, where each channel of the output section is configured to deliver the at least one distributed LV signal for use by at least one LV device.

These and other aspects, objects, features, and embodiments will be apparent from the following description and the appended claims.

BRIEF DESCRIPTION OF THE DRAWINGS

The drawings illustrate only example embodiments of distributed low voltage power systems and are therefore not to be considered limiting of its scope, as distributed low voltage power systems may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
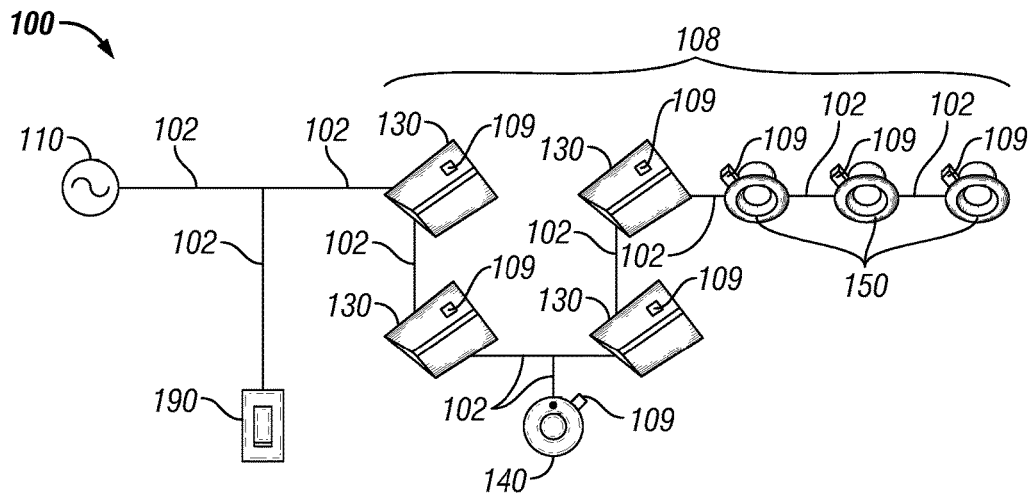
FIG. 1 shows a system diagram of a distributed power system currently known in the art.

The example embodiments discussed herein are directed to systems, apparatuses, and methods of distributed low voltage power systems. While example embodiments described herein are directed to use with lighting systems, example embodiments can also be used in systems having other types of devices. Examples of such other systems can include, but are not limited to, security systems, fire protection systems, emergency management systems, and assembly systems. Thus, example embodiments are not limited to use with lighting systems.

Example embodiments can be used with one or more of any number of low voltage system infrastructures. For instance, example embodiments can use Ethernet cables coupled to output channels of a power-over-Ethernet (PoE) switch, where the PDM (defined below) and/or a point-of-load (POL) controller (also defined below) acts as the POE switch. As another example, the PDM can serve as a gateway, where multiple devices are connected to the output channels of the PDM. In this way, the PDM can act as a POL controller. As yet another example, the PDM can act as a gateway, which in turn can cause the PDM to act as a POL controller.

As defined herein, a mode of operation is defined by certain factors existing or not existing and/or by certain components of an example system described herein operating or not operating. For example, a first mode of operation can be defined when a primary power source delivers line voltage power, and a second mode of operation can be defined when the primary power source fails to deliver line voltage power. As another example, a first mode of operation can be defined during "off peak" hours when power prices are relatively low, and a second mode of operation can be defined during "peak" hours when power prices are relatively high.

As described herein, a user can be any person that interacts with example distributed low voltage power systems. Examples of a user may include, but are not limited to, a consumer, an electrician, an engineer, a mechanic, a pipe fitter, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In certain example embodiments, the distributed low voltage power systems (or portions thereof) described herein meet one or more of a number of standards, codes, regulations, and/or other requirements established and maintained by one or more entities. Examples of such entities include, but are not limited to, Underwriters' Laboratories, the Institute of Electrical and Electronics Engineers, and the National Fire Protection Association. For example, wiring (the wire itself and/or the installation of such wire) that electrically couples an example PDM (defined below) with a device may fall within one or more standards set forth in the National Electric Code (NEC). Specifically, the NEC defines Class 1 circuits and Class 2 circuits under various Articles, depending on the application of use.

Class 1 circuits under the NEC typically operate using line voltages (e.g., between 120 VAC and 600 VAC). The wiring used for Class 1 circuits under the NEC must be run in raceways, conduit, and enclosures for splices and terminations. Consequently, wiring for Class 1 circuits must be installed by a licensed electrical professional. By contrast, Class 2 circuits under the NEC typically operate at lower power levels (e.g., up to 100 VA, no more than 60 VDC). The wiring used for Class 2 circuits under the NEC does not need to be run in raceways, conduit, and/or enclosures for splices and terminations. Specifically, the NEC defines a Class 2 circuit as that portion of a wiring system between the load side of a Class 2 power source and the connected equipment. Due to its power limitations, a Class 2 circuit is considered safe from a fire initiation standpoint and provides acceptable protection from electrical shock. Consequently, wiring for Class 2 circuits can be installed by someone other than a licensed electrical professional.

As another example, the International Electrotechnical Commission (IEC) sets and maintains multiple standards and categorizations of electrical supply for a system. One such categorization is separated or safety extra-low voltage (SELV) is an electrical system in which the voltage cannot exceed 25 V AC RMS (root-mean-square) (35 V AC peak) or 60 V DC under dry, normal conditions, and under single-fault conditions, including earth faults in other circuits. Another such categorization is protected extra-low voltage (PELV) is an electrical system in which the voltage cannot exceed 25 V AC RMS (35 V AC peak) or 60 V DC under dry, normal conditions, and under single-fault conditions, except earth faults in other circuits. Yet another such categorization is functional extra-low voltage (FELV) is an electrical system in which the voltage cannot exceed 25 V AC RMS (35 V AC peak) or 60 V DC under normal conditions.

Example embodiments of distributed low voltage power systems will be described more fully hereinafter with reference to the accompanying drawings, in which example embodiments of distributed low voltage power systems are shown. Distributed low voltage power systems may, however, be embodied in many different forms and should not be construed as limited to the example embodiments set forth herein. Rather, these example embodiments are provided so that this disclosure will be thorough and complete, and will fully convey the scope of distributed low voltage power systems to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation, and are not meant to limit embodiments of distributed low voltage power systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a distributed power system 100 currently known in the art. The system 100 of FIG. 1 includes a power source 110, a number (in this case, four) of troffer lights 130, a number (in this case, three) of can lights 150, a number (in this case, one) of sensing devices 140, and a number (in this case, one) of controllers 190. All of these components of the system 100 are electrically coupled to each other by a number of line voltage cables 102. Operational components of the system 100 (or any system described herein), such as the troffer lights 130, the can lights 150, and the sensing devices 140 can be referred to generally as "LV devices". As defined herein, a LV device 108 can be any device coupled to the output channel of a POL control device 109 (defined below) to receive an LV signal. In this case, the LV devices 108 include the troffer lights 130, the can lights 150, the controllers 190, the inverter 160, the wall outlet 170, the photocell/timer 141, and the sensing device 140

The sensing device 140 can be any device that detects one or more conditions. Examples of a sensing device 140 can include, but are not limited to, a photocell, a motion detector, an audio detector, a pressure detector, a temperature sensor, and an air flow sensor. The controller 190 can be any device that controls one or more of the other devices in the system 100. Examples of a controller 190 can include, but are not limited to, a thermostat, a dimmer switch, a control switch, a control panel, and a power switch. A controller 190 can also be called by other names, including but not limited to a master controller, an external controller, and a network manager. A controller 190 can be coupled to any of a number of PDMs and/or other components in any of a number of systems.

The power source 110 generates and/or delivers, directly or indirectly, electrical power that is a higher voltage than the voltage ultimately used by the various low-voltage (LV) devices (e.g., troffer lights 130, can lights 150, sensing device 140) in the system 100. The power generated or delivered by the power source 110 can be called line voltage power. The line voltage power is a power that is typically delivered to a house, building, or other similar structure that supplies electricity located within or proximate to such structure. The power source 110 can also generate DC power. Examples of voltages generated by the power source 110 can include 120 VAC, 240 VAC, 277 VAC, and 480 VAC. If the line voltage power is AC power, the frequency can be 50 Hz, 60 Hz, or some other frequency. Examples of a power source 110 can include, but are not limited to, a battery, a solar panel, a wind turbine, a power capacitor, an energy storage device, a power transformer, a fuel cell, a generator, and a circuit panel. As defined herein, a line voltage includes any of a number of voltages that is typically at least as great as the maximum LV signal (described below), and that is typically a nominal service voltage such as 120 VAC, 277 VAC, or 480 VDC.

The line voltage power is sent, directly or indirectly, from the power source 110 to the other components of the system 100 using the line voltage cables 102. The line voltage cables 102 can include one or more conductors made of one or more electrically conductive materials (e.g., copper, aluminum). The size (e.g., gauge) of the line voltage cables 102 (and/or conductors therein) are sufficient to carry the line voltage power of the power source 110. Each line voltage cable 102 may be coated with an insulator made of any suitable material (e.g., rubber, plastic) to keep the electrical conductors electrically isolated from any other conductor in the line voltage cable 102.

In certain example embodiments, one or more of the LV devices 108 (in this case, the light troffers 130, the can lights 150, the sensing device 140, and the controller 190) in the system 100 that receive the line voltage power from the power source 110 use an amount and/or type (e.g., DC, AC) of power that is different from the amount and type of line voltage power generated by the power source 110. For example, the line voltage power can be AC power, and the LV devices 108 of the system 100 require DC power to operate. In such a case, the device can include a local power transfer device (not shown). A local power transfer device can be used to receive line voltage power from a line voltage cable 102 and to output LV power (also called a LV signal), where the LV power can be used by the associated LV device 108. As defined herein, a LV signal has a voltage that does not exceed approximately 42.4 VAC (root mean square) or 60 VDC.

The power transfer device can include one or more of a number of components that alter the amount and/or a type of the line voltage power. Such components can include, but are not limited to, a transformer (for raising or lowering a level of AC power), a rectifier (for generating DC power from AC power), and an inverter (for generating AC power from DC power). The power transfer device can include solid state components and/or discrete components (e.g., resistors, capacitors, diodes).

In embodiments currently used in the art, each LV device 108 (e.g., the troffer lights 130, the can lights 150, the sensing device 140) has its own point-of-load (POL) control device 109. Each POL control device 109 (also called, among other names, a driver, an LED driver, or a ballast) is usually located within a housing of the LV device 108 and is designed to receive a LV signal. When a LV signal is received by the POL control device 109, the POL control device 109 provides power regulation and control to the LV device 108. Each POL control device 109 currently used in the art has only a single output channel, and so only enables a single function (e.g., dimming, enable a particular color light) of a single LV device 108.

Systems currently known in the art, such as the system 100 shown in FIG. 1, involve at least a line voltage signal (e.g., 120 VAC-277 VAC), which may also include a low voltage signal (defined below). In any case, the inclusion of line voltage signals delivered to LV devices 108 (e.g., troffer lights 130, sensing devices 140) cannot be classified as a "safe" system under currently-existing standards and/or regulations. For example, such a system cannot be considered a NEC Class 2 system. As another example, such a system cannot be considered free from risk of fire and/or electrical shock.

Further, using a combination of existing technologies cannot logically or rationally be combined to achieve the example systems described herein. In some cases, modifying one or more existing systems known in the art to achieve the example systems described herein would require changing the entire architecture of that system, essentially rendering the existing system inoperable. For example, an existing system known in the art that uses a programmable logic controller (PLC) to control individual devices in the system would have to be prohibitively altered to feed varying low voltage signals to devices coupled to the same PLC channel.

As another example, a number of existing systems known in the art send low voltage signals to a single LV device 108, either on its own or in parallel with other LV devices 108, rather than multiple LV devices 108 in series. Put another way, existing systems operate on a point-to-point architecture, and so require "homerun" wiring between a device and a controller. This architecture is, by definition, required because such systems known in the art operate on the PoE model. As discussed above and as explained blow, in some cases, example embodiments can be used within a PoE architecture.

Figure 2:
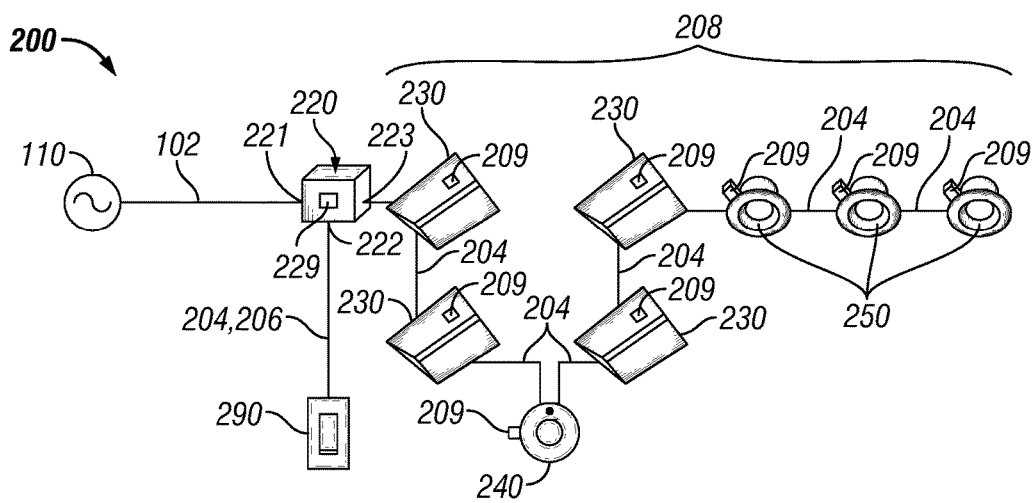
FIG. 2 shows a system diagram of a distributed low voltage power system in accordance with certain example embodiments.

FIG. 2 shows a system diagram of a distributed low voltage power system 200 in accordance with certain example embodiments. In one or more embodiments, one or more of the components shown in FIG. 2 may be omitted, repeated, and/or substituted. Accordingly, embodiments of distributed low voltage power systems should not be considered limited to the specific arrangements of components shown in FIG. 2.

Referring to FIGS. 1 and 2, the system 200 of FIG. 2 differs from the system 100 of FIG. 1 in several respects. The power source 110 and line voltage cable 102 in the system 200 of FIG. 2 are substantially the same as they are in the system 100 of FIG. 1. Further, the LV devices 208 (in this case, the troffer lights 230, the can lights 250, the controller 290, and the sensing device 240 (e.g., an occupancy sensor, a daylight sensor, an air quality sensor, a temperature sensor, a pressure sensor)) are substantially the same as the corresponding LV devices 108 of the system 100 of FIG. 1, except that the LV devices 208 of the system 200 of FIG. 2 may not have a power transfer device.

Specifically, the LV devices 208 (e.g., the troffer lights 230, the can lights 250, the controller 290, and the sensing device 240) of FIG. 2 may not require a power transfer device because the power that each of these devices receive is LV power in a type and amount (e.g., 100 W, 48 VDC) used by such devices. In certain example embodiments, a LV device 208 can include or be coupled to a power transfer device that receives the LV signal and generates, using a POL control module 209 and the LV signal, a level and type of power used by the LV device 208. However, one or more of these LV devices 208 can have a local controller function that performs one or more of a number of functions. Such functions can include, but are not limited to, receiving instructions (as from the power distribution module 220 or PDM 220), collecting and recording operational data, recording communications with the PDM 220 and/or other devices, and sending operational data to the PDM 220 and/or other devices.

The example LV devices 208 (e.g., the troffer lights 230, the can lights 250, the sensing device 240) listed above are not meant to be limiting. Examples of other LV devices 208 that can receive and use (directly or indirectly) LV signals from the PDM 220 can include, but are not limited to, a power source (e.g., a LED driver, a ballast, a buck converter, a buck-boost converter), a controller (e.g., a pulse width modulator, a pulse amplitude modulator, a constant current reduction dimmer), a keypad, a touchscreen, a dimming switch, a thermostat, a shade controller, a universal serial bus charger, and a meter (e.g., water meter, gas meter, electric meter).

The troffer lights 230, the can lights 250, the controller 290, and the sensing device 240 are each electrically coupled, directly or indirectly, to the PDM 220. The PDM 220 is electrically coupled to the power source 110 using the line voltage cable 102. The PDM 220 can include a power transfer device that generates one or more of a number of LV signals for one or more of the LV devices 208 (e.g., the troffer lights 230, the can lights 250, the sensing device 240) in the system 200. The PDM 220 can have an input portion (e.g., input channel 221), an output portion (e.g., output channel 222, output channel 223), and the power transfer device 229. The power transfer device 229 of the PDM 220 can be essentially the same as the power transfer device described above for each of the devices in the system 100 of FIG. 1.

In certain example embodiments, the input portion of the PDM 220 can include one or more input channels 221 that receive the line voltage power from the power source 110. When the PDM 220 has multiple input channels 221, each input channel 211 can have the same, or different, amount and/or type of line voltage as the other input channels 221 of the PDM 220. The output portion of the PDM 220 can include one or more of a number (e.g., one, two, five, ten) of output channels (e.g., output channel 222, output channel 223), where each output channel (also called an outlet channel) of the output section delivers one or more LV signals for use by one or more LV devices 208 of the system 200 that are electrically coupled to that output channel of the output portion of the PDM 220.

The amount and/or type of power of the LV signal of one output channel can be substantially the same as, or different than, the amount and/or type of power of the LV signal of another output channel of the output portion of the PDM 220. For example, each output channel of the PDM 220 can output 100 W, 48 VDC of power (also called the LV signal). The LV signals delivered by an output channel of the PDM 220 can be at a constant level and/or a variable level. The LV signals can change a state (e.g., on, off, dim, standby) of one or more devices. In addition, or in the alternative, the LV signal can send data (e.g., instructions, requests, information, status).

In certain example embodiments, one or more LV cables 204 are used to electrically couple, directly or indirectly, each of the LV devices 208 (e.g., the troffer lights 230, the can lights 250, the sensing device 240) in the system 200 to the PDM 220. The LV cables 204 can have one or more pairs of conductors. Each pair of conductors of the LV cable 204 can deliver LV signals that represent power signals and/or communication signals. In some cases, a LV cable 204 has at least one pair of conductors that carries power signals and at least one pair of conductors that carries control signals. The LV cables 204 can be plenum rated. For example, one or more of the LV cables 204 can be used in drop ceilings without conduit or cable trays.

The PDM 220 can also communicate, using an output channel (in this case, output channel 222) with one or more controllers 290 using a communication link 206. The communication link 206 can be an Ethernet cable, a RS45 cable, and/or some other wired technology. In addition, or in the alternative, the communication link 206 can be a network using wireless technology (e.g., Wi-Fi, Zigbee, 6LoPan). As described below with respect to FIGS. 7-9B, one or more communication links 206 (e.g., Ethernet cable) can be coupled to one or more output channels of a PDM 220, to an input channel of a POL control device 209, and/or to one or more output channels of a POL control device 209, so that the communication links 206, in place of the LV cables 204, can deliver LV power (with or without communication signals) to one or more of the LV devices 208. The controller 290 can be communicably coupled to one or more other systems in addition to the PDM 220 of the system 200. Similarly, the PDM 220 can be coupled to one or more other PDMs in one or more other systems. The system 200 can have multiple PDMs 220, where each PDM 220 of the system 200 provides LV power and communicates (sends and receives data) with each other, a controller 290, and/or one or more LV devices 208.

In addition to the capabilities of the controller 190 listed above with respect to FIG. 1, the controller 290 of FIG. 2 can communicate with (e.g., send instructions to, receive data about one or more LV devices 208 from) the PDM 220. Instructions sent by the controller 290 to the PDM 220 can affect the operation of all devices coupled to one or more particular channels of the PDM 220, particular devices coupled to one or more particular channels of the PDM 220, or any combination thereof. Communication between the PDM 220, the controller 290, and the controllers in one or more devices of the system 200 can include the transfer (sending and/or receiving) of data. Communications between the PDM 220, the controller 290, and/or a LV device 208 (e.g., the troffer lights 230, the can lights 250, the sensing device 240) can be made through the LV cables 204 and/or the communication link 206, using wired and/or wireless technology.

Such data can include instructions, status reports, notifications, and/or any other type of information. Specific examples of data and/or instructions sent between the PDM 220, the controller 290, and/or a LV device 208 (e.g., the troffer lights 230, the can lights 250, the sensing device 240) can include, but are not limited to, a light level, a light fade rate, a demand response, occupancy of an area, detection of daylight, a security override, a temperature, a measurement of power, a measurement or calculation of power factor, operational status, a mode of operation, a dimming curve, a color and/or correlated color temperature (CCT), a manual action, manufacturing information, performance information, warranty information, air quality measurements, upgrade of firmware, update of software, position of a shade, an a device identifier.

Communications between the PDM 220, the controller 290, and/or a LV device 208 (e.g., the troffer lights 230, the can lights 250, the sensing device 240) can be based on one or more of a number of factors. For example, communications can be based on an algorithm or formula set forth in software and/or hardware within one or more components of the system 200. As another example, communications can be based on events associated with a LV device 208 or other component of the system. Such events can include, but are not limited to, light intensity, an emergency condition, demand response, passage of time, and a time sweep. Communications between the PDM 220, the controller 290, and/or a LV device 208 (e.g., the troffer lights 230, the can lights 250, the sensing device 240) can be made through the LV cables 204 and/or the communication link 206, using wired and/or wireless technology.

In certain example embodiments, the PDM 220 can include communication and diagnostic capabilities. Communications can be with the controller 290, one or more devices coupled to the PDM 220, other PDMs 220 in the system 200, a user device, and/or any other component of the system 200. Diagnostic capabilities can be for operations of the system 200 overall, for operations of the PDM 220, for operations of one or more LV devices 208 coupled to the PDM 220, for operations of one or more other PDMs in the system 200, and/or for any other components of the system 200.

The PDM 220, the controller 290, and/or the POL controllers 209 of one or more LV devices 208 can include a hardware processor-based component that executes software instructions using integrated circuits, discrete components, and/or other mechanical and/or electronic architecture. In addition, or in the alternative, the PDM 220, the controller 290, and/or the POL controllers 209 of one or more LV devices 208 can include one or more of a number of non-hardware-based components. An example of such a non-hardware-based components can include one or more field programmable gate arrays (FPGA).

Using FPGAs and/or other similar devices known in the art allows the PDM 220, the controller 290, and/or the POL controllers 209 of one or more LV devices 208 to be programmable and function according to certain logic rules and thresholds without the use, or with limited use, of a hardware processor. The PDM 220 can also have one or more of a number of other hardware and/or software components, including but not limited to a storage repository, memory, an application interface, and a security module. Similarly, the controller 290 and/or a POL control module 209 of one or more LV devices 208 in the system 200 can include one or more software and/or hardware components, including but not limited to those listed above for the PDM 220.

Figure 3:
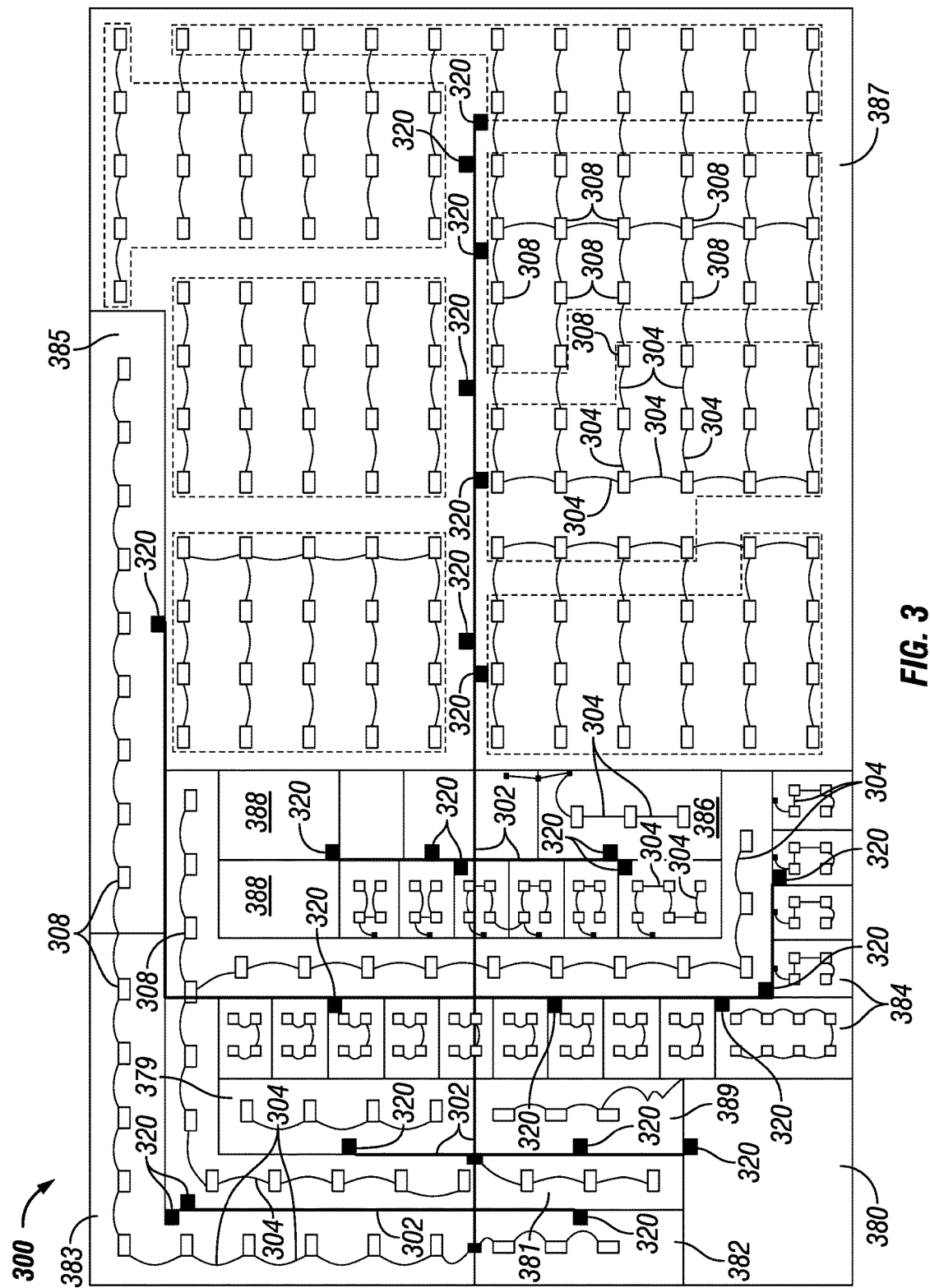
FIG. 3 shows a system diagram of another distributed low voltage power system in accordance with certain example embodiments.

FIG. 3 shows a system diagram of another distributed low voltage power system 300 in accordance with certain example embodiments. In one or more embodiments, one or more of the components shown in FIG. 3 may be omitted, repeated, and/or substituted. Accordingly, embodiments of distributed low voltage power systems should not be considered limited to the specific arrangements of components shown in FIG. 3.

Referring to FIGS. 1-3, the system 300 in this case is in a single-story, multi-occupant office building. The office building can include a lobby 300, a number of storage rooms (e.g., storage room 385, storage room 386), a large conference room 387, a number of office areas (e.g., office area 379, office area 382, office area 383, office area 384, and office area 389), a number of small conference rooms 388, and a hallway 381 that connects all of the aforementioned office spaces. In this system 300, there are multiple PDMs 320, with at least one PDM 320 designated for each office space.

Referring to FIGS. 1-3, the system 300 in this case is in a single-story, multi-occupant office building. The office building can include a lobby 380, a number of storage rooms (e.g., storage room 385, storage room 386), a large conference room 387, a number of office areas (e.g., office area 379, office area 382, office area 383, office area 384, and office area 389), a number of small conference rooms 388, and a hallway 381 that connects all of the aforementioned office spaces. In this system 300, there are multiple PDMs 320, with at least one PDM 320 designated for each office space.

Figure 4:
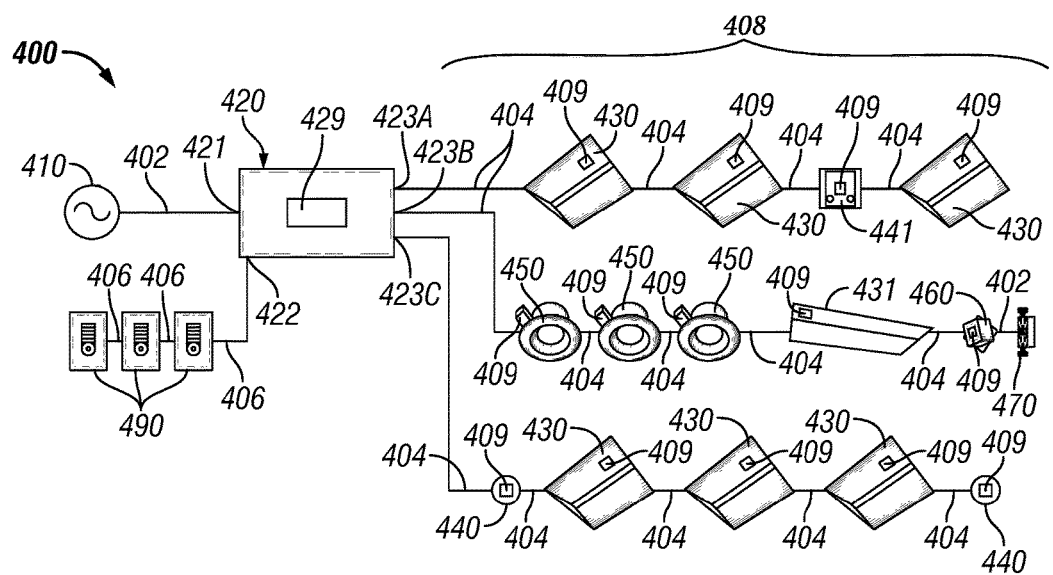
FIG. 4 shows a system diagram of yet another distributed low voltage power system in accordance with certain example embodiments.

FIG. 4 shows a system diagram of yet another distributed low voltage power system in accordance with certain example embodiments. In one or more embodiments, one or more of the components shown in FIG. 4 may be omitted, repeated, and/or substituted. Accordingly, embodiments of distributed low voltage power systems should not be considered limited to the specific arrangements of components shown in FIG. 4.

Referring to FIGS. 1-4, the system 400 of FIG. 4 has a PDM 420 that includes a power transfer device 429 and has input channel 421 and output channel 422. The PDM 420 receives line voltage power from power source 410 at input channel 421 through line voltage cable 402. The PDM 420 communicates with one or more (in this case, three) controllers 490 at output channel 422 through communication link 406. The PDM 420 also has three other output channels 423 (output channel 423A, output channel 423B, and output channel 423C) that provide LV signals through LV cables 404. Output channel 423A of the PDM 420 provides LV signals in series to two troffer lights 430, a photocell/timer 441, and another troffer light 430. Output channel 423B of the PDM 420 provides LV signals in series to three can lights 450, a different troffer light 431, and an inverter 460, which feeds AC power to a wall outlet 470 using a line voltage cable 402. Output channel 423C of the PDM 420 provides LV signals in series to a motion sensor 440, three light troffers 430, and another motion sensor 440.

As discussed above, in the current art, a single POL control module (e.g., POL control module 409) is used to control a single aspect of the operation of a single LV device. This leads to high costs, as the POL control module is relatively expensive relative to the other components of a LV device. In certain example embodiments, a new POL control module having multiple output channels is used to control multiple LV devices and/or multiple functions of a single LV device.

The multiple output channels 423 of the PDM 420 can be utilized in any of a number of ways. For example, one or more specific output channels 423 can be used to send LV signals that are specifically addressed to particular LV devices 408 and/or particular POL control modules 409. For example, if a LV signal is only intended for one or more of the LV devices 408 coupled to output channel 423A of the PDM 420, then the PDM 420 can only send the LV signal to output channel 423A and not output channels 423B and 423C.

As another example, the PDM 420 can send an addressable LV signal that is intended for some, but not all, LV devices coupled to an output channel 423. For example, if the PDM 420 sends a LV signal through output channel 423B that is only intended for the first two can lights 450 and for no other LV devices 408 (in this case, the third can light 450, the troffer light 431, and the inverter 460) that are coupled to the output channel 423B, then the LV signal can only be sent to output channel 423B (and not output channel 423A or output channel 423C). When this occurs, the POL control module 409 of the first can light 450 can receive the LV signal, determine that only the first two can lights 450 operate, and control the first two can lights 450 based on the LV signal.

As another example, the PDM 420 can broadcast an addressable LV signal to all of the POL control devices 409 using all of the output channels 423. In such a case, the addressable LV signal is intended for some, but not all, of the POL control devices 409. When a POL control device 409 receives the addressable LV signal from the PDM 420, the POL control device 409 can determine whether the addressable LV signal is intended for itself (which can include any LV devices 408 downstream of the POL control device 409). If the LV signal is not intended for a particular POL control device 409, then that POL control device 409 ignores the LV signal. On the other hand, if the LV signal is intended for a particular POL control device 409, then that POL control device 409 executes the instructions of the LV signal.

Figure 5:
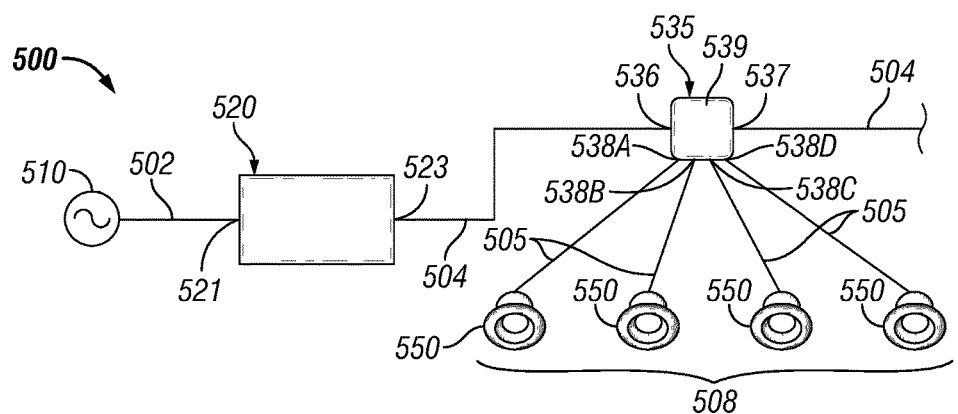
FIG. 5 shows a system diagram of still another distributed low voltage power system in accordance with certain example embodiments.
Figure 6B:
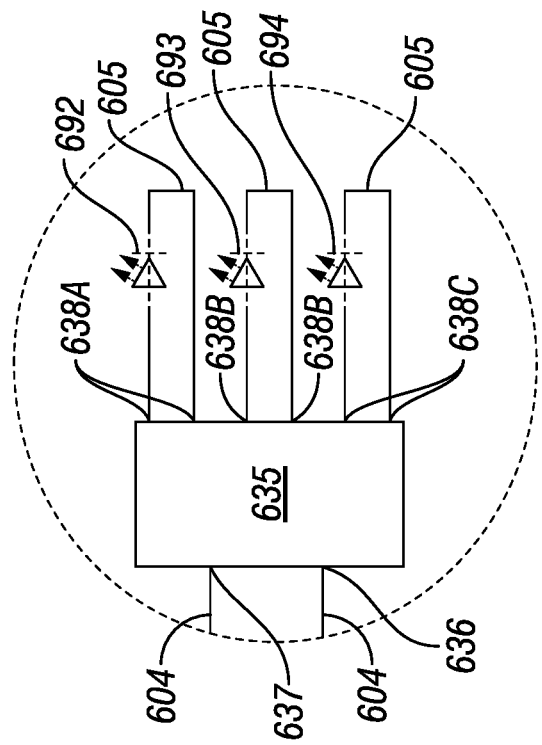
FIGS. 6A and 6B show a system diagram of yet another distributed low voltage power system in accordance with certain example embodiments.
Figure 6A:
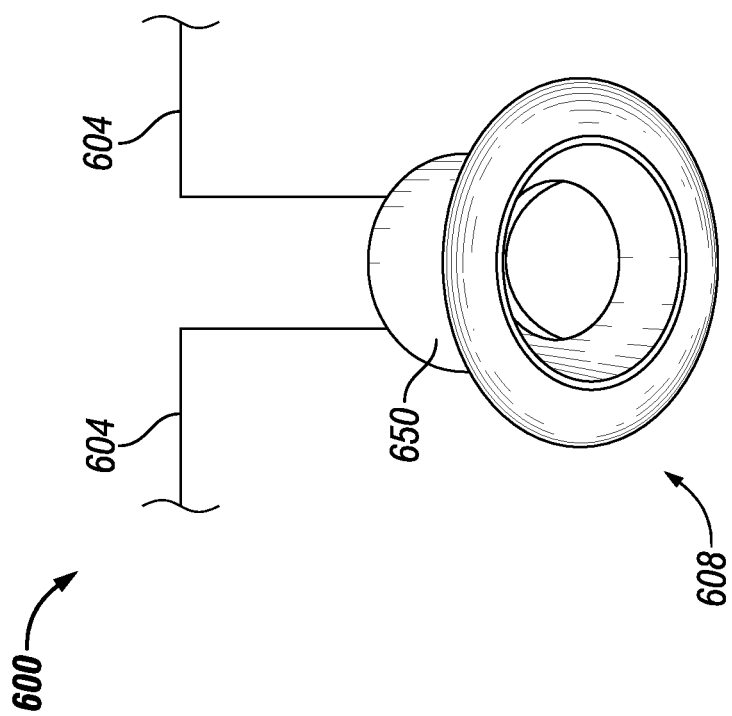

For example, FIG. 5 shows a system diagram of still another distributed low voltage power system 500 in accordance with certain example embodiments. Further, FIGS. 6A and 6B show a system diagram of yet another distributed low voltage power system 600 in accordance with certain example embodiments. In one or more embodiments, one or more of the components shown in FIGS. 5, 6A, and 6B may be omitted, repeated, and/or substituted. Accordingly, embodiments of distributed low voltage power systems should not be considered limited to the specific arrangements of components shown in FIGS. 5, 6A, and 6B.

Referring to FIGS. 1-6B, the system 500 of FIG. 5 is substantially the same as the system 400 of FIG. 4, except as described below. The PDM 520 receives line voltage power from power source 510 at input channel 521 through line voltage cable 502. In this case, there is only one output channel 523 of the PDM 520. The output channel 523 of the PDM 520 is coupled to an example multiple output channel POL control module 535 using a LV cable 504. The multiple output channel POL control module 535 functions substantially the same as the POL control modules (e.g., POL control module 409) described above and currently used in the art, except that the output portion of the example multiple output channel POL control module 535 has multiple (in this case, four) output channels (in this case, output channel 538A, output channel 538B, output channel 538C, and output channel 538D). In some cases, a POL control module 535 and/or a POL control device (e.g., POL control device 409) can be considered a LV device. Further, in some cases, the terms "POL control device" and "POL control module" can be used interchangeably.

In certain example embodiments, the multiple output channel POL control module 535 has a body 539 and includes an input portion (in this case, defined by input channel 536) and an output portion. The output portion can include multiple output channels (e.g., output channel 538A, output channel 538B, output channel 538C, output channel 538D), where each output channel 538 is coupled to a LV device 508. For example, as shown in FIG. 5, each output channel 538 is coupled to a can light 550.

The multiple output channel POL control module 535 can be coupled to the LV devices 508 using one or more communication links 505. A communication link 505 can be a LV cable 504, a communication link (e.g., Ethernet cable) such as the communication link 206 described above, or some other wired technology. In addition, or in the alternative, the communication link 505 can be a network using wireless technology (e.g., Wi-Fi, Zigbee, 6LoPan). The multiple output channel POL control module 535 can be communicably coupled to one or more other PDMs in addition to the PDM 520 of the system 500.

The output portion of the multiple output channel POL control module 535 can also include an output channel 537 that allows the multiple output channel POL control module 535 to connect to, using a LV cable 504, another multiple output channel POL control module 535 and/or one or more other LV devices 508. The system 500 can have multiple output channel POL control modules 535, where each multi-output POL control module 535 of the system 500 provides power regulation and control to multiple LV devices 508.

In this case, since the input channel 536 of the multiple output channel POL control module 535 is connected via a LV cable 504, the multiple output channel POL control module 535 is classified as a Class 2 (low power, up to 100 Watts) device connected to a Class 2 network. In certain example embodiments, the multiple output channel POL control module 535 is a separate device from the LV devices 508 to which the multiple output channel POL control module 535 is coupled. In such a case, the multiple output channel POL control module 535 can be located physically proximate to the LV devices 508 to which the multiple output channel POL control module 535 is coupled.

By controlling the multiple LV devices 508 of FIG. 5 with the single multiple output channel POL control module 535, the cost of each LV device 508 is lower compared to similar LV devices currently used in the art because the LV devices 508 do not need a POL control module. Further, even though multiple LV devices 508 are controlled by the multiple output channel POL control module 535, the power regulation and control provided to one LV device 508 by the multiple output channel POL control module 535 can be the same as, and/or different than, the power regulation and control provided to the other LV devices 508 by the multiple output channel POL control module 535.

In addition, or in the alternative, a multiple output channel POL control module 635 can be integrated with a LV device 608 (e.g., the can light 650 of FIG. 6A). In such a case, the multiple output channel POL control module 635 can provide power regulation and control that address multiple functions (e.g., dimming, color selection) for a single LV device 608. For example, as shown in the system 600 of FIGS. 6A and 6B, the can light 650 includes a multiple output channel POL control module 635 that controls three different color outputs of the can light 650. As with the multiple output channel POL control module 535 of FIG. 5, the output portion of the example multiple output channel POL control module 635 has multiple (in this case, three) output channels (in this case, output channel 638A, output channel 638B, and output channel 638C).

In certain example embodiments, the multiple output channel POL control module 635 includes an input portion (in this case, defined by input channel 636) and an output portion. The output portion can include multiple output channels (e.g., output channel 638A, output channel 638B, output channel 638C), where each output channel 638 is coupled to a different portion (in this case, red LED 692, green LED 693, and blue LED 694, respectively) of the LV device 608. As such, the multiple output channel POL control module 635 can turn on/off each LED individually. The multiple output channel POL control module 635 can be coupled to the LEDs of the LV device 608 using one or more (in this case, one for each output channel) communication links 605. A communication link 605 can be substantially the same as the communication link 505 described above.

The input channel 636 of the multiple output channel POL control module 635 can be communicably coupled to one or more devices (e.g., a PDM) using a LV cable 604. The output portion of the multiple output channel POL control module 635 can also include an output channel 637 that allows the multiple output channel POL control module 635 to connect to, using a LV cable 604, one or more other components (e.g., one or more other LV devices 608) of the system 600. The system 600 can have multiple output channel POL control modules 635, where each multi-output POL control module 635 of the system 600 provides power regulation and control to multiple LV devices 608 and/or to multiple functions of a single LV device 608.

In this case, since the input channel 636 of the multiple output channel POL control module 635 is connected via a LV cable 604, LV device 608 that includes the multiple output channel POL control module 635 is classified as a Class 2 (low power, up to 100 Watts) device connected to a Class 2 network. In certain example embodiments, the multiple output channel POL control module 635 is part of the LV device 608 and controls multiple functions of the LV device 608. Examples of such functions can include, but are not limited to, color changing, warm dimming, CCT tuning, and up-down lights for a LV device 608 with multiple luminaires.

By controlling multiple functions of the LV device 608 of FIGS. 6A and 6B with the integrated single multiple output channel POL control module 635, the cost of the LV device 608 is lower compared to similar LV devices currently used in the art because the LV devices 608 do not need multiple POL control modules. Further, while not shown in FIGS. 6A and 6B, a hybrid situation between the system 600 of FIGS. 6A and 6B and the system 500 of FIG. 5 can be possible, where a multiple output channel POL control module 635 that is integrated with a LV device 608 can provide power regulation and control for one or more functions of that LV device 608 while also providing power regulation and control for one or more other LV devices 608 coupled to an output channel 638 of the multiple output channel POL control module 635.

A multiple output channel POL control module (e.g., multiple output channel POL control module 535, multiple output channel POL control module 635) can be configured and have communication capabilities (including programmability) such as those discussed above for the PDM and/or a controller (e.g., controller 290). For example, in order for each output channel of a multiple output channel POL control module to be individually controlled, each output channel can be configured in one or more of a number of ways to become enabled based on the content of a LV signal, the time of day, the occurrence of an event, and/or some other trigger.

Figure 7:
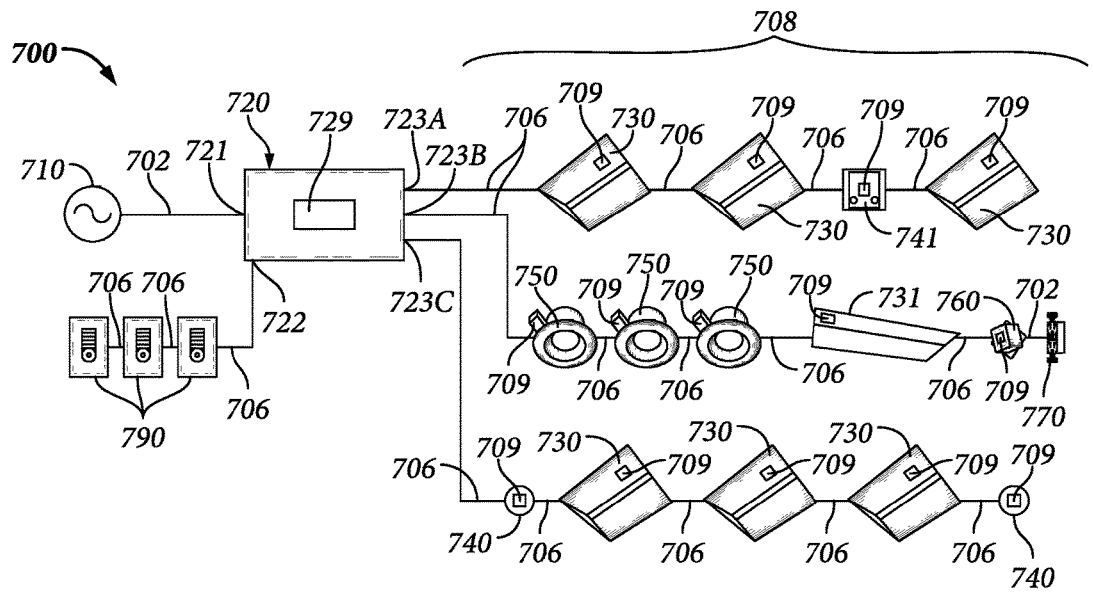
FIG. 7 shows a system diagram of yet another distributed low voltage power system in accordance with certain example embodiments.

FIG. 7 shows a system diagram of yet another distributed low voltage power system 700 in accordance with certain example embodiments. The distributed low voltage power system 700 of FIG. 7 is substantially the same as the distributed low voltage power system 400 of FIG. 4 (including addressability of the LV signals generated by the PDM 720 and sent to the various LV devices 708), except that the LV cables 404 of FIG. 4 are replaced with communication links 706 in FIG. 7. In other words, communication links 706 (e.g., Ethernet cables) are used to provide the LV signals from the PDM 720 to the various LV devices 708 in the distributed low voltage power system 700 of FIG. 7.

Figure 8:
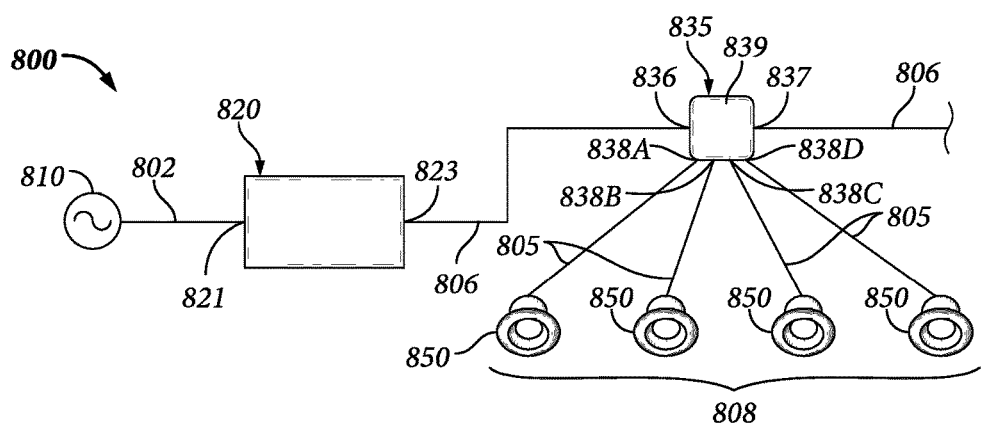
FIG. 8 shows a system diagram of still another distributed low voltage power system in accordance with certain example embodiments.

FIG. 8 shows a system diagram of still another distributed low voltage power system 800 in accordance with certain example embodiments. The distributed low voltage power system 800 of FIG. 8 is substantially the same as the distributed low voltage power system 500 of FIG. 5, except that the LV cables 504 of FIG. 5 are replaced with communication links 806 in FIG. 8. In other words, communication links 806 (e.g., Ethernet cables) are used to provide the LV signals from the PDM 820 to the stand-along POL control module 835 in the distributed low voltage power system 800 of FIG. 8.

Figure 9B:
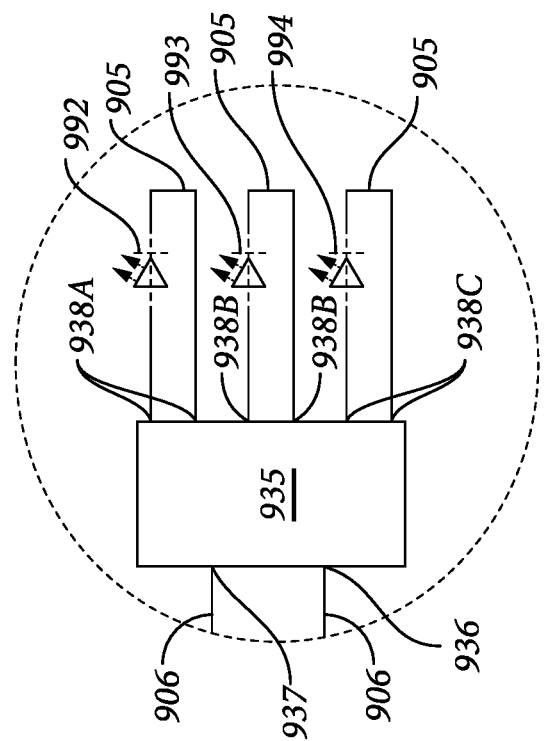
FIGS. 9A and 9B show a system diagram of yet another distributed low voltage power system in accordance with certain example embodiments.
Figure 9A:
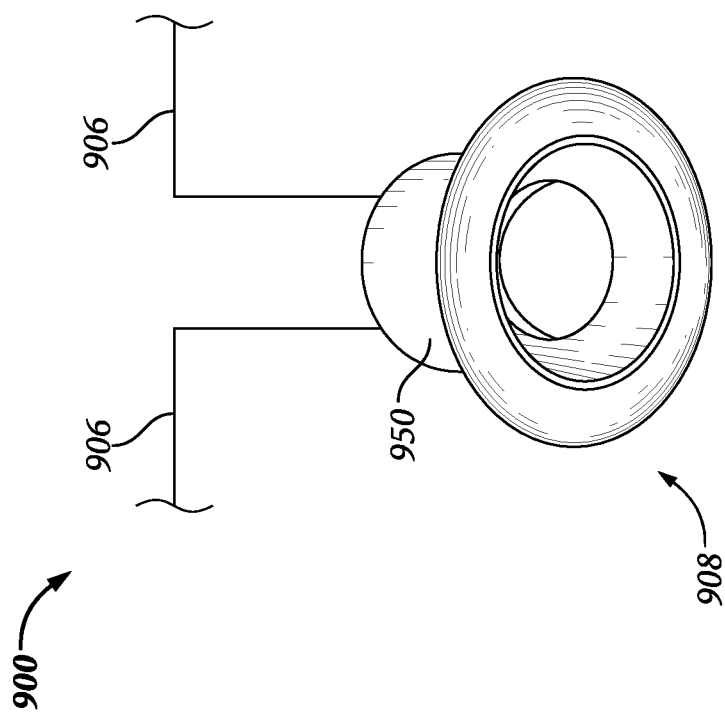

FIGS. 9A and 9B show a system diagram of yet another distributed low voltage power system 900 in accordance with certain example embodiments. The distributed low voltage power system 900 of FIGS. 9A and 9B is substantially the same as the distributed low voltage power system 600 of FIGS. 6A and 6B, except that the LV cables 604 of FIG. 6 are replaced with communication links 906 in FIGS. 9A and 9B. In other words, communication links 906 (e.g., Ethernet cables) are used to provide the LV signals to the POL control module 935 of an LV device 908 in the distributed low voltage power system 900 of FIGS. 9A and 9B.

Example embodiments provide a number of benefits. Examples of such benefits include, but are not limited to, reduction in energy usage; more simplistic installation, replacement, modification, and maintenance of a system; qualification as a Class 2 device and/or system; compliance with one or more applicable standards and/or regulations; less need for licensed electricians; reduced downtime of equipment; lower maintenance costs, avoidance of catastrophic failure; increased flexibility in system design and implementation; prognosis of equipment failure; improved maintenance planning; and reduced cost of labor and materials. Example embodiments can also be integrated (e.g., retrofitted) with existing systems.

Example embodiments are electrically safe. Example systems or any portion thereof can be free from risk (or a greatly reduced risk) of fire or electrical shock for any user installing, using, replacing, and/or maintaining any portion of example embodiments. For example, the LV signals that feed a device can allow a user to maintain the device without fear of fire or electrical shock. While Class 2 systems and SELV/PELV/FELV are described above, example embodiments can comply with one or more of a number of similar standards and/or regulations throughout the world.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A distributed low voltage power system, comprising:
 a power source generating line voltage power;
 a first line voltage cable comprising a first line voltage end and a second line voltage end, wherein the first line voltage end is coupled to the power source;
 a first power distribution module (PDM) comprising a first power transfer device, wherein the second line voltage end of the first line voltage cable is coupled to the first PDM, wherein the first PDM receives input power from the power source through the first line voltage cable, wherein the first power transfer device generates a first low-voltage (LV) signal from the input power, and wherein the first PDM comprises a first output channel;
 a first communication link coupled to the first output channel of the first PDM;
 a first point-of-load (POL) control device of a plurality of POL control devices coupled to the first PDM, wherein the first POL control device is coupled to the first output channel of the first PDM using the first communication link, wherein the first POL control device generates at least one first distributed LV signal based on the first LV signal received from the first PDM; and
 at least one first LV device coupled to the first POL control device, wherein the first POL control device sends the at least one first distributed LV signal to the at least one first LV device, wherein the first LV signal sent by the first PDM is specifically addressed to the first POL control device and the at least one first LV device, wherein the at least one first distributed LV signal provides power regulation to the at least one first LV device, and wherein only the first POL control device of the plurality of POL control devices executes instructions of the first LV signal.

2. The distributed low voltage power system of claim 1, further comprising:
 a second POL control device coupled to a second output channel of the first PDM using a second communication link, wherein the second POL control device generates at least one second distributed LV signal based on a second LV signal received from the first PDM; and
 at least one second LV device coupled to the second POL control device, wherein the second POL control device sends the at least one second distributed LV signal to the at least one second LV device, wherein the at least one second distributed LV signal provides the power regulation to the at least one second LV device.

3. The distributed low voltage power system of claim 1, further comprising:
 a second line voltage cable having a third line voltage end and a fourth line voltage end, wherein the third line voltage end is coupled to the power source;
 a second PDM comprising a second power transfer device, wherein the fourth line voltage end of the second line voltage cable is coupled to the second PDM, wherein the second PDM receives the input power from the power source through the second line voltage cable, wherein the second power transfer device generates a second LV signal from the input power, and wherein the second PDM comprises a second output channel;
 a second communication link coupled to the second output channel of the second PDM;
 a second POL control device coupled to the second PDM using the second communication link, wherein the second POL control device generates at least one second distributed LV signal based on the second LV signal received from the second PDM; and
 at least one second LV device coupled to the second POL control device, wherein the second POL control device sends the at least one second distributed LV signal to the at least one second LV device, wherein the at least one second distributed LV signal provides power regulation to the at least one second LV device.

4. The distributed low voltage power system of claim 1, wherein the first POL control device tracks activity of the at least one first LV device.

5. The distributed low voltage power system of claim 4, wherein the first PDM further comprises a PDM controller communicably coupled to the first POL control device, wherein the PDM controller is configured to send local data of the PDM controller to the first POL control device and receive local data of the first POL control device from the first POL control device.

6. The distributed low voltage power system of claim 5, further comprising:
at least one additional controller of a second PDM communicably coupled to the PDM controller of the first PDM, wherein the at least one additional controller sends system data of the at least one additional controller to the PDM controller and receives system data of the PDM controller from the PDM controller, wherein the system data of the PDM controller and the at least one additional controller comprises the local data.

7. The distributed low voltage power system of claim 1, wherein the first LV signal transmits direct current power.

8. The distributed low voltage power system of claim 1, wherein the at least one first LV device qualifies as a Class 2 device.

9. The distributed low voltage power system of claim 1, wherein the first LV signal is sent by the first PDM specifically to the at least one first LV device and the first POL control device to which the first LV signal is addressed by the first PDM.

10. The distributed low voltage power system of claim 1, wherein the at least one LV device is used for lighting applications.

11. The distributed low voltage power system of claim 1, wherein the first POL control device comprises multiple output channels.

12. The distributed low voltage power system of claim 11, wherein the at least one first LV device comprises a plurality of first LV devices connected in parallel with each other, wherein each of the plurality of first LV devices is coupled to one of the multiple output channels of the first POL control device.

13. The distributed low voltage power system of claim 11, wherein the at least one first LV device performs a plurality of functions, wherein each output channel of the multiple output channels of the first POL control device provides the power regulation and control for a function of the plurality of functions.

14. The distributed low voltage power system of claim 1, wherein the first communication link comprises an Ethernet cable.

15. The distributed low voltage power system of claim 1, wherein the first LV signal is broadcast to the plurality of POL control devices coupled to the first PDM, wherein a remainder of the plurality of POL control devices has a different address than the first POL control device, wherein the remainder of the plurality of POL control devices receives and ignores the first LV signal.

16. The distributed low voltage power system of claim 15, wherein the first LV signal is broadcast out of the first output channel.

17. A point-of-load (POL) control module of a plurality of POL control modules, wherein the POL control module comprises:
an input portion configured to receive a first communication link that carries at least one low-voltage (LV) signal from a power distribution module (PDM), wherein the at least one LV signal is addressed to the POL control module and at least one LV device, wherein the PDM is coupled to the plurality of POL control modules;
an output section comprising a plurality of channels, wherein at least one of the plurality of channels of the output section is configured to be coupled to the at least one LV device; and
a controller device electrically coupled to the input portion and the output portion, wherein the controller device is configured to generate at least one distributed LV signal for the at least one LV device based on the at least one LV signal, wherein the controller is further configured to send the at least one distributed LV signal to the at least one LV device through at least one of the plurality of output channels, and wherein only the POL control module of the plurality of POL control modules executes instructions of the at least one LV signal.

18. The POL control module of claim 17, wherein the at least one distributed LV signal is sent to the at least one LV device using at least one second communication link coupled to the output section.

19. The POL control module of claim 17, wherein the at least one LV signal comprises power and communication signals.

20. The POL control module of claim 17, wherein the controller device is further configured to avoid sending the at least one distributed LV signal to at least one additional LV device coupled to at least one of the plurality of channels, wherein the at least one additional LV device has a different address than the at least one LV device.

* * * * *